United States Patent
Longman et al.

(10) Patent No.: US 11,555,920 B2
(45) Date of Patent: Jan. 17, 2023

(54) ESTIMATING VEHICLE VELOCITY USING RADAR DATA

(71) Applicant: GM GLOBAL TECHNOLOGY OPERATIONS LLC, Detroit, MI (US)

(72) Inventors: Oren Longman, Herzliya (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 17/082,533

(22) Filed: Oct. 28, 2020

(65) Prior Publication Data

US 2022/0128685 A1    Apr. 28, 2022

(51) Int. Cl.
| | |
|---|---|
| *G01S 13/931* | (2020.01) |
| *G01S 13/58* | (2006.01) |
| *G01S 7/288* | (2006.01) |
| *G01S 13/92* | (2006.01) |

(52) U.S. Cl.
CPC ............ *G01S 13/931* (2013.01); *G01S 7/288* (2013.01); *G01S 13/583* (2013.01); *G01S 13/92* (2013.01); *G01S 7/2883* (2021.05); *G01S 2013/9321* (2013.01)

(58) Field of Classification Search
CPC .......... G01S 7/356; G01S 7/295; G01S 7/288; G01S 7/2883; G01S 2013/93271; G01S 2013/9321; G01S 13/931; G01S 13/582; G01S 13/89; G01S 13/42; G01S 13/584; G01S 13/583; G01S 13/87
USPC ......... 342/70, 195, 107, 196, 191, 108, 136, 342/192, 59
See application file for complete search history.

(56) References Cited

U.S. PATENT DOCUMENTS

| | | | | |
|---|---|---|---|---|
| 4,563,686 A | * | 1/1986 | Boles | G01S 13/90 342/25 C |
| 4,851,848 A | * | 7/1989 | Wehner | G01S 13/9011 342/201 |
| 5,343,204 A | * | 8/1994 | Farmer | G01S 13/9019 342/195 |
| 5,424,742 A | * | 6/1995 | Long | G01S 13/904 342/25 C |
| 5,508,706 A | * | 4/1996 | Tsou | G01S 7/032 342/192 |

(Continued)

FOREIGN PATENT DOCUMENTS

| | | | | | |
|---|---|---|---|---|---|
| DE | 102018000880 B3 | * | 2/2019 | ............. | B60K 31/00 |
| DE | 102017216795 A1 | * | 3/2019 | ............. | G01S 13/93 |
| GB | 2521259 A | * | 6/2015 | ............. | G01S 13/06 |

*Primary Examiner* — Erin F Heard
*Assistant Examiner* — Michael W Justice
(74) *Attorney, Agent, or Firm* — Lorenz & Kopf, LLP

(57) ABSTRACT

Methods and systems for estimating vehicle velocity based on radar data. The methods and systems include receiving a set of range-Doppler-beam, RDB, maps from radars located on a vehicle and performing an optimization process that adjusts an estimate of vehicle velocity so as to optimize a correlation score. The optimization process includes iteratively: spatially registering the set of RDB maps based on the current estimate of vehicle velocity, determining the correlation score based on the spatially registered set of RDB maps, and outputting an optimized estimate of vehicle velocity from the optimization process when the correlation score has been optimized. The methods and systems control the vehicle based at least in part on the optimized estimate of vehicle velocity.

17 Claims, 6 Drawing Sheets

(56) References Cited

U.S. PATENT DOCUMENTS

| | | | | |
|---|---|---|---|---|
| 5,659,318 A * | 8/1997 | Madsen | | G01S 13/9023 342/25 C |
| 5,818,383 A * | 10/1998 | Stockburger | | G01S 7/415 342/161 |
| 7,420,502 B2 * | 9/2008 | Hartzstein | | H01Q 19/17 342/72 |
| 7,796,829 B2 * | 9/2010 | Nguyen | | G01S 13/9017 342/26 R |
| 8,063,815 B2 * | 11/2011 | Valo | | G06V 10/752 342/25 R |
| 9,110,170 B1 * | 8/2015 | Woollard | | G01S 13/89 |
| 9,274,219 B2 * | 3/2016 | Lamb | | G01S 13/904 |
| 9,292,792 B1 * | 3/2016 | Pedersen | | G06K 9/6261 |
| 9,599,706 B2 * | 3/2017 | Zeng | | B60T 7/22 |
| 9,600,765 B1 * | 3/2017 | Pedersen | | G06N 5/02 |
| 9,983,294 B2 * | 5/2018 | Oshima | | G01S 13/58 |
| 10,261,179 B2 * | 4/2019 | Davis | | G01S 13/87 |
| 10,705,185 B1 * | 7/2020 | Lien | | G01S 13/56 |
| 11,029,403 B2 * | 6/2021 | Raj | | G01S 13/904 |
| 11,262,448 B2 * | 3/2022 | Davis | | G01S 7/023 |
| 2003/0218563 A1 * | 11/2003 | Miyahara | | G01S 13/931 342/107 |
| 2005/0285773 A1 * | 12/2005 | Hartzstein | | H01Q 1/3233 342/107 |
| 2009/0184865 A1 * | 7/2009 | Valo | | G06V 10/752 342/25 F |
| 2010/0141508 A1 * | 6/2010 | Nguyen | | G01S 13/9089 342/159 |
| 2013/0009807 A1 * | 1/2013 | Lamb | | G01S 13/904 342/25 B |
| 2015/0338505 A1 * | 11/2015 | Oshima | | G01S 13/931 342/107 |
| 2016/0018511 A1 * | 1/2016 | Nayyar | | G01S 7/03 342/27 |
| 2016/0084941 A1 * | 3/2016 | Arage | | G01S 7/41 342/91 |
| 2016/0084943 A1 * | 3/2016 | Arage | | G01S 13/42 342/102 |
| 2016/0291143 A1 * | 10/2016 | Cao | | G01S 13/874 |
| 2017/0234968 A1 * | 8/2017 | Roger | | G01S 7/288 342/93 |
| 2018/0252809 A1 * | 9/2018 | Davis | | G01S 7/0234 |
| 2019/0187275 A1 * | 6/2019 | Raj | | G01S 7/04 |
| 2019/0271776 A1 * | 9/2019 | Davis | | G01S 7/0234 |
| 2020/0393541 A1 * | 12/2020 | Schmid | | G01S 7/414 |
| 2021/0026006 A1 * | 1/2021 | Steiner | | G01S 13/872 |

* cited by examiner

ESTIMATING VEHICLE VELOCITY USING RADAR DATA

INTRODUCTION

The technical field generally relates to vehicles, and more particularly relates to methods and systems for estimation of vehicle velocity.

Vehicles utilize motion data including vehicle velocity in a variety of vehicle control applications including advanced driver assistance systems (ADAS) and autonomous driving tasks as two of many possible examples. Vehicle velocity and other dynamic vehicle motion measurements can be obtained by an inertial measurement unit (IMU) and a global positioning system (GPS). IMUs can be expensive and complex to install. IMUs are not always accurate, they do not sense velocity directly, but sense acceleration. GPS does not have coverage in all areas such as in tunnels, bridges, when surrounded by tall buildings, etc.

Many vehicles utilize radar systems. For example, certain vehicles utilize radar systems to detect other vehicles, pedestrians, or other objects on a road in which the vehicle is travelling. Radar systems may be used, for example, in implementing automatic braking systems, adaptive cruise control, and avoidance features, among other vehicle features.

Accordingly, it is desirable to provide vehicle velocity data without necessarily always relying on GPS or IMU data. In addition, it is desirable to expand the applications of radar systems of a vehicle. Furthermore, other desirable features and characteristics of the present invention will become apparent from the subsequent detailed description and the appended claims, taken in conjunction with the accompanying drawings and the foregoing technical field and background.

SUMMARY

In a first aspect, a method of estimating vehicle velocity based on radar data is provided. The method includes receiving a set of range-Doppler-beam, RDB, maps from radar located on a vehicle and performing an optimization process that adjusts an estimate of vehicle velocity so as to optimize a correlation score. The optimization process includes iteratively spatially registering the set of RDB maps based on the current estimate of vehicle velocity, and determining the correlation score based on the spatially registered set of RDB maps. An optimized estimate of vehicle velocity is output from the optimization process when the correlation score has been optimized. The vehicle is controlled based on the optimized estimate of vehicle velocity.

In embodiments, the set of RDB maps include RDB maps from a plurality of radars located at different positions and/or orientations with respect to the vehicle.

In embodiments, the set of RDB maps include a current and/or a previous frame from the radar.

In embodiments, spatially registering the set of RDB maps includes rotating an azimuth angle of the set of RDB maps to a local coordinate system based on the current estimate of vehicle velocity.

In embodiments, spatially registering the set of RDB maps includes, for each of the RDB maps, virtually rotating the radar according to a Doppler based azimuth angle, thereby transforming range Doppler maps of the RDB maps. The Doppler based azimuth angle is determined based on Doppler data and the current estimate of vehicle velocity. Spatially registering the set of RDB maps includes, for each of the RDB maps, virtually rotating the radar according to a second azimuth angle. The second azimuth angle is determined based on radar orientation information for the radar relative to a local coordinate frame of the vehicle, thereby transforming range beam maps of the RDB maps. The transformed range Doppler maps and the transformed range beam maps are multiplied to provide azimuth rotated RDB maps. The azimuth rotated RDB maps form a basis for determining the spatially registered set of RDB maps.

In embodiments, the set of RDB maps includes a current and previous frame, wherein spatially registering the set of RDB maps includes correcting for vehicle movement between the current and previous frames based on the current estimate of vehicle velocity and the frame rate.

In embodiments, the optimization process utilizes an optimization algorithm.

In embodiments, the set of RDB maps are received from a pre-processing module that performs analog to digital conversion, range fast Fourier transform, FFT, Doppler FFT and beamforming processes.

In another aspect, a vehicle is provided. The vehicle includes radar located on the vehicle, and a processor in operable communication with the radar, the processor configured to execute program instructions, wherein the program instructions are configured to cause the processor to: receive a set of range-Doppler-beam, RDB, maps from the radar located on a vehicle, and perform an optimization process that adjusts an estimate of vehicle velocity so as to optimize a correlation score. The optimization process includes iteratively spatially registering the set of RDB maps based on the current estimate of vehicle velocity, and determining the correlation score based on the spatially registered set of RDB maps. An optimized estimate of vehicle velocity is output from the optimization process when the correlation score has been optimized. The vehicle is controlled based in part on the optimized estimate of vehicle velocity.

In embodiments, the set of RDB maps include RDB maps from a plurality of radars located at different positions and/or orientations with respect to the vehicle.

In embodiments, the set of RDB maps include a current and/or a previous frame from the radar.

In embodiments, spatially registering the set of RDB maps includes rotating an azimuth angle of the set of RDB maps to a local coordinate system based on the current estimate of vehicle velocity.

In embodiments, spatially registering the set of RDB maps includes, for each of the RDB maps, virtually rotating the radar according to a Doppler based azimuth angle, thereby transforming range Doppler maps of the RDB maps. The Doppler based azimuth angle is determined based on Doppler data and the current estimate of vehicle velocity. Spatially registering the set of RDB maps includes, for each of the RDB maps, virtually rotating the radar according to a second azimuth angle. The second azimuth angle is determined based on radar orientation information for the radar relative to a local coordinate frame of the vehicle, thereby transforming range beam maps of the RDB maps. The transformed range Doppler maps and the transformed range beam maps are multiplied to provide azimuth rotated RDB maps. The azimuth rotated RDB maps form a basis for determining the spatially registered set of RDB maps.

In embodiments, the set of RDB maps includes a current and previous frame, wherein spatially registering the set of RDB maps includes correcting for vehicle movement between the current and previous frames based on the current estimate of vehicle velocity and the frame rate.

In embodiments, the optimization process utilizes an optimization algorithm.

In embodiments, the set of RDB maps are received from a pre-processing module that performs analog to digital conversion, range fast Fourier transform, FFT, Doppler FFT and beamforming processes.

In a yet further aspect, a system for estimating vehicle velocity based on radar data is provided. The system includes radar locatable on a vehicle; and a processor in operable communication with the radar, the processor configured to execute program instructions, wherein the program instructions are configured to cause the processor to: receive a set of range-Doppler-beam, RDB, maps from radar located on a vehicle, and perform an optimization process that adjusts an estimate of vehicle velocity so as to optimize a correlation score. The optimization process includes iteratively: spatially registering the set of RDB maps based on the current estimate of vehicle velocity, and determining the correlation score based on the spatially registered set of RDB maps. An optimized estimate of vehicle velocity is output from the optimization process when the correlation score has been optimized. The vehicle is controlled based in part on the optimized estimate of vehicle velocity.

In embodiments, the set of RDB maps include RDB maps from a plurality of radars located at different positions and/or orientations with respect to the vehicle.

In embodiments, the set of RDB maps include a current and/or a previous frame from the radar.

In embodiments, spatially registering the set of RDB maps includes rotating an azimuth angle of the set of RDB maps to a local coordinate system based on the current estimate of vehicle velocity.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
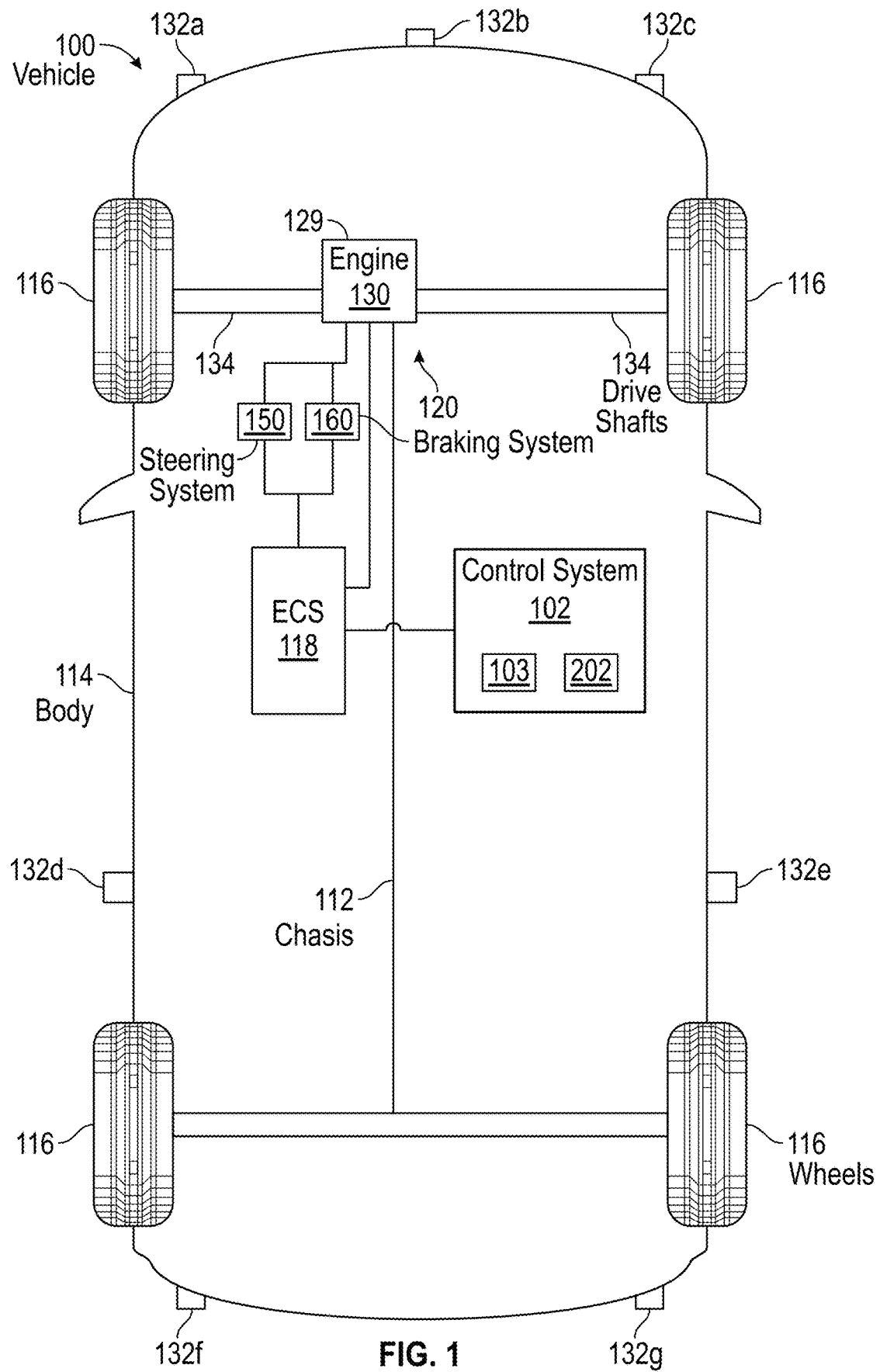
FIG. 1 is a functional block diagram of a vehicle that includes radars and a control system, in accordance with an exemplary embodiment.

FIG. 1 illustrates a vehicle 100, or automobile, according to an exemplary embodiment. As described in greater detail further below, the vehicle 100 includes a control system 102 for utilizing radar data to estimate host vehicle dynamics, particularly vehicle velocity. This can be achieved by correlating different information dimensions: including correlating Doppler and beam dimensions, spatial dimensions from different radars and correlating radar data over time. Transformation across these dimensions is based on a candidate vehicle velocity that is optimized using a degree of registration of the radar data as the optimization goal. High correlation indicates a correct candidate vehicle velocity. The optimization can be obtained via an optimization algorithm.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 10 may differ from that depicted in FIG. 1. For example, in certain embodiments the number of wheels 116 may vary. By way of additional example, in various embodiments the vehicle 10 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 10, in certain embodiments the vehicle 10 may not include a steering wheel and/or steering column. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 10, in certain embodiments steering, braking, and/or acceleration can be commanded by a computer instead of by a driver (in one such embodiment, a computer of the vehicle may use input from the radar system to steer, brake, and/or accelerate the vehicle).

In the embodiment of FIG. 1, the vehicle 100 includes a plurality of radar devices 132a to 132g mounted to the body 114. The radar devices (radars) 132a to 132g include forward looking radar devices 132a to 132c, side looking radar devices 132d, 132e and/or rearward looking radar devices 132f, 132g. The various radar devices 132a to 132g may be provided as part of a park assist system, a rear collision warning system, a cross traffic alerts system, an emergency braking system, a pedestrian detection system, a forward collision avoidance system, and/or blind spot detection system, among other possible systems utilizing radar data as in input for various vehicle outputs. Although seven radar devices 132a to 132g are illustrated in FIG. 1, less or more radar devices may be provided. The radar devices 132a to 132g may be short, medium or long range radar devices. The radar devices 132a to 132g, after pre-processing of raw radar data, each produce a Range-Doppler-Beam (RDB) map, as described further herein below. At least some of the radar devices 132a to 132g have overlapping fields of view such that various RDB maps at least partially spatially overlap.

The control system 102 is mounted on the chassis 112. The control system 102 provides for vehicle odometry via RDB map registration. The control system 102 implements radar based vehicle dynamics estimation using radar data registration by matching three dynamic projections of a set of RDB maps from the radar devices 132a to 132g: range-beam to range-Doppler, Range-Doppler-Beam maps correlations between different radars and over time. The control system 102, in one example, provides these functions in accordance with the method 500 described further below in connection with FIG. 5 and the associated data transformations and processes of FIGS. 3, 4, 6 and 7.

While the control system 102 and the radar system 202 are depicted as being part of the same system, it will be appreciated that, in certain embodiments, these features may comprise two or more systems. In addition, in various embodiments the control system 102 may comprise all or part of, and/or may be coupled to, various other vehicle devices and systems, such as, among others, the actuator assembly 120, and/or the electronic control system 118.

Figure 2:
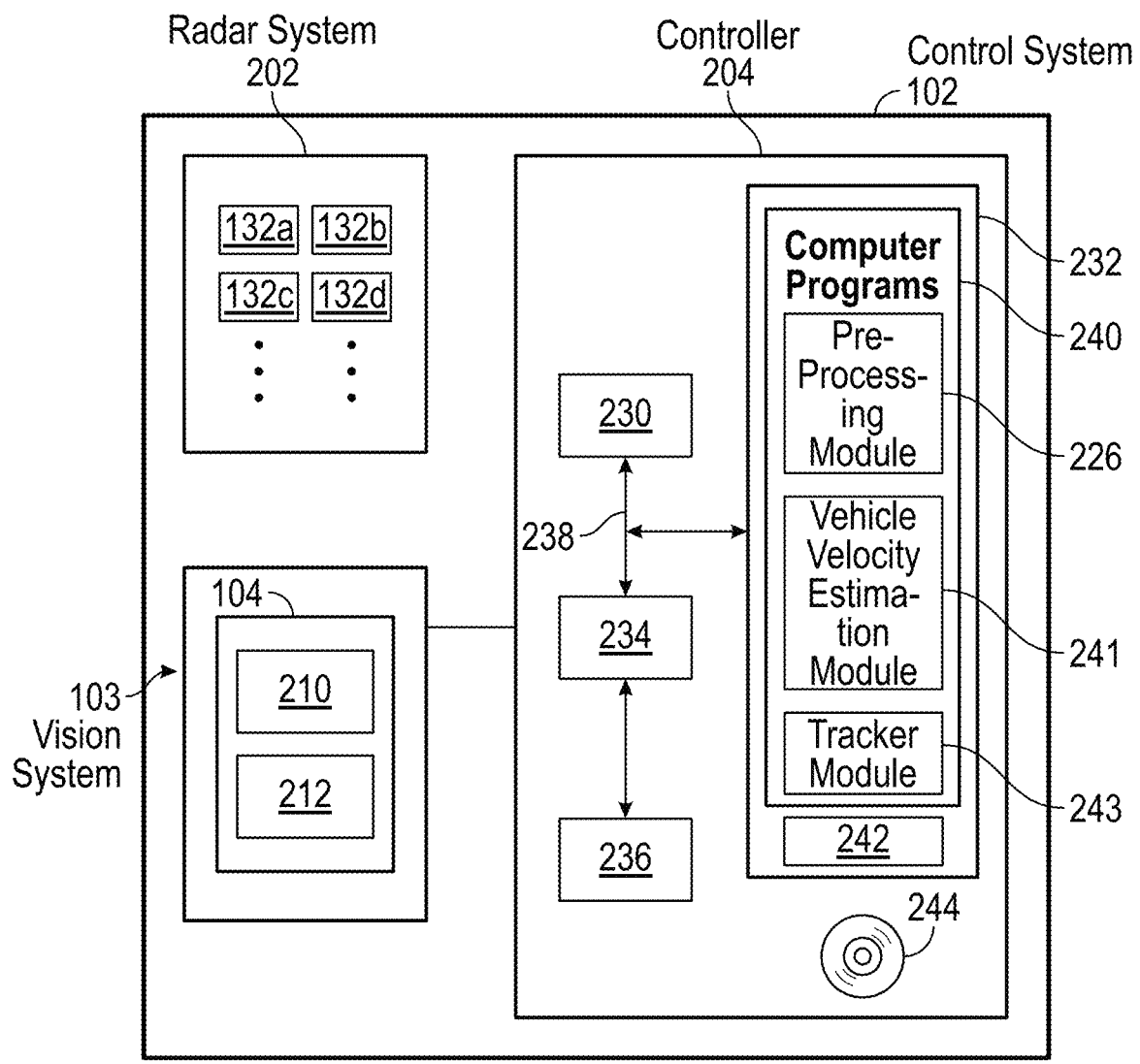
FIG. 2 is a functional block diagram of the control system of the vehicle of FIG. 1, in accordance with an exemplary embodiment.

With reference to FIG. 2, a functional block diagram is provided for the control system 102 of FIG. 1, in accordance with an exemplary embodiment. As depicted in FIG. 2, the control system 102 includes a radar system 202 and a controller 204. The radar system 202 is included as part of the vision system 103, which may include one or more additional sensors 104 as shown in FIGS. 1 and 2. In the depicted embodiment, the sensors 104 include one or more cameras 210 and one or more light detection and ranging (LIDAR) systems 212. The camera(s) 210, LIDAR system(s) 212 and radar system 202 obtain respective sensor information identifying objects on or near a road in which the vehicle 100 is travelling, such as moving or stationary vehicles on or alongside the road, pedestrians, bicyclists, animals, buildings, trees, guard rails, medians, and/or other objects on or alongside the road.

Also as depicted in FIG. 2, the radar system 202 includes the plurality of radar devices 132a to 132g. Each radar device includes, in one embodiment, a transmitter (or a transmitter antenna), a receiver (or a receiver antenna) and a pre-processing module 226. In another embodiment, a common pre-processing module 226 may be provided. The transmitter transmits radar signals in the form of time separated, frequency modulated chirps. After the transmitted radar signals contact one or more objects on or near a road on which the vehicle 100 is located (either stationary or travelling) and is reflected/redirected toward the radar system 202, the redirected radar signals are received by the receiver of the respective radar device 132a to 132g.

As depicted in FIG. 2, the controller 204 is coupled to the radar system 202 and the sensors 104. Similar to the discussion above, in certain embodiments the controller 204 may be disposed in whole or in part within or as part of the radar system 202. In addition, in certain embodiments, the controller 204 is also coupled to one or more other vehicle systems (such as the electronic control system 118 of FIG. 1). The controller 204 receives the information sensed or determined from the radar system 202 and the sensors 104. In one embodiment, the controller 204 receives raw radar data from the radar system 202, pre-process the radar data in a pre-processing module 226 of the controller to provide a set of RDB maps. The controller 204 estimates vehicle velocity, in a vehicle velocity estimation module 241, by spatially registering the RDB maps using an estimated vehicle velocity that is optimized until sufficient RDB map registration has been achieved. The controller 204 generally performs these functions in accordance with the method 500 and data flow diagrams of FIGS. 3 to 5 described further below.

As depicted in FIG. 2, the controller 204 comprises a computer system. In certain embodiments, the controller 204 may also include one or more of the radar system 202, sensor(s) 104, one or more other systems, and/or components thereof. In addition, it will be appreciated that the controller 204 may otherwise differ from the embodiment depicted in FIG. 2. For example, the controller 204 may be coupled to or may otherwise utilize one or more remote computer systems and/or other control systems, such as the electronic control system 118 of FIG. 1.

In the depicted embodiment, the computer system of the controller 204 includes a processor 230, a memory 232, an interface 234, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the processes described herein, such as the method 500 described further below in connection with FIG. 5 and the data flow processes of FIGS. 3 and 4. The one or more programs 240 include a pre-processing module 226, a vehicle velocity estimation module 241 and a tracker module 243 for performing steps of method 500 described in detail below. Although vehicle velocity estimation module 241 is shown included under computer programs in FIG. 2, it should be understood that the vehicle velocity estimation module 241 could be stored as a computer program in memory of radar system 202 and executed by at least one processor of radar system 202.

The processor 230 is capable of executing one or more programs (i.e., running software) to perform various tasks encoded in the program(s), particularly the pre-processing, the velocity estimation and the tracker modules 226, 241, 243. The processor 230 may be a microprocessor, microcontroller, application specific integrated circuit (ASIC) or other suitable device as realized by those skilled in the art.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 204. The interface 234 allows communication to the computer system of the controller 204, for example from a system driver and/or another computer system, and can be implemented using any suitable method and apparatus. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 (including computer modules 241 and 243) that executes one or more embodiments of one or more processes of the present disclosure, such as the steps of the method 500 (and any sub-processes thereof) described further below in connection with FIGS. 4 to 11. In another exemplary embodiment, the program product may be directly stored in and/or otherwise accessed by the memory 232 and/or a disk (e.g., disk 244), such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
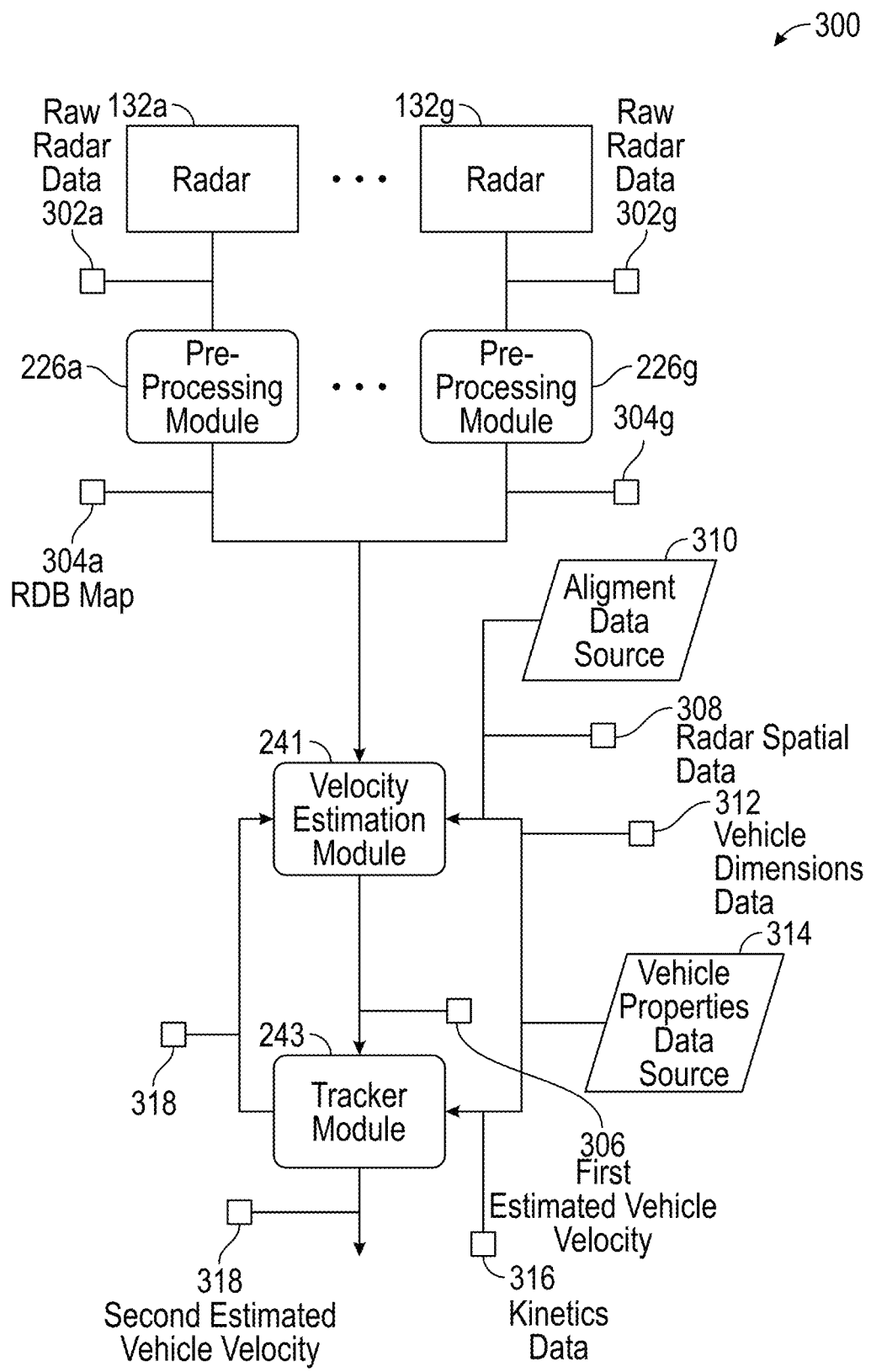
FIG. 3 is a data flow diagram according to a vehicle velocity estimation process performed by the vehicle of FIG. 1 and the control system of FIG. 2, in accordance with an exemplary embodiment.

With additional reference to the data flow diagram 300 of FIG. 3, the or each pre-processing module 226*a*, 226*b* processes the received radar signals to provide RDB data in the form of a set of RDB maps 304*a*, 304*b*. In the exemplary embodiment, respective pre-processing modules 226*a* to 226*g* apply pre-processing steps to the raw radar data 302*a* to 302*g* received from respective ones of the radar devices 132*a* to 132*g*. However, in another embodiment, a common pre-processing module 206 may be utilized. Raw radar data 302*a* to 302*g* in the form of an analog radar receipt signal is converted in parallel into a set of RDB maps 304*a* to 304*g* by the or each pre-processing module 226. Specifically, in one embodiment, the or each pre-processing module 226 applies the following pre-processing steps: a radar signal is received from a radar device 132*a* to 132*g* and is subjected to analog to digital Conversion (ADC), range fast Fourier transform (FFT) processing, Doppler FFT processing and beamforming processing to generate an RDB map 304*a* to 304*g*. Beamforming is a type of FFT. Whereas regular FFTs transform time to frequency (e.g. the range FFT and the Doppler FFT), beamforming FFT transforms space to directivity. Thus, the RDB maps 304*a* to 304*g* embody distance (range), velocity (Doppler), and directional (beam) information. Such pre-processing steps are available to the skilled person.

In embodiments, the set of RDB maps 304 are respectively obtained from a plurality of radar devices 134*a* to 134*g*. Additionally or alternatively, the set of RDB maps 304 can include an expanded data set by encompassing at least one previous frame of RDB maps from the same plurality of radar devices 134*a* to 134*g*. The number of historical frames of RDB maps is a variable parameter determined based on a balance between processing efficiency and correctness of a resulting vehicle velocity estimate. For example, 1 to 20 previous frames of RDB maps could be used (including specifically designating any integer between 1 and 20).

Continuing to refer to FIGS. 2 and 3, the set of RDB maps 304*a* to 304*g* from the or each pre-processing module 226 is supplied as an input to the vehicle velocity estimation module 241. The vehicle velocity estimation module 241 implements an iterative optimization process that spatially registers the set of RDB maps 304*a* to 304*g* in a local coordinate frame of the vehicle 100. The spatial registration is performed based on an estimated vehicle velocity. Registration is further based on radar spatial data 308 from an alignment data source 310 and vehicle dimensions data 312 from a vehicle properties data source 314. The radar spatial data 308 and the vehicle dimensions data 312 can be combined to define the orientation and the spatial position of each radar device 132a to 132g. The alignment data source 310 and the vehicle properties data source 314 may be stored on the storage device 236. The degree of registration will be greater the more correct the estimated vehicle velocity is with respect to the actual vehicle velocity. The degree of registration or correlation score is determined by the optimization process and the estimated vehicle velocity is adjusted to optimize the correlation score. Once the degree of registration or correlation score is sufficiently optimized, the optimization process will output a first estimated vehicle velocity 306.

The first estimated vehicle velocity 306 is input to a tracker module 243, which at least smooths the estimated vehicle velocity based on historical estimated vehicle velocity data, the input current first estimated vehicle velocity 306 and also based on a prediction of vehicle velocity obtained from a vehicle dynamics model embodied in the tracker module 243. The vehicle dynamics model may be populated by kinetics data 316 obtained from the vehicle properties data source 314. The tracker module 243 thus produces a second estimated vehicle velocity 318 based on historical estimates of vehicle velocity, the current first estimated vehicle velocity 306 and based on a vehicle dynamics model that predicts vehicle velocity. In one example, the tracker module 243 utilizes a Kalman filter. The second estimated vehicle velocity 318 is fed back to the vehicle velocity estimation module 241 for use as a first estimate of vehicle velocity that will be adjusted during the optimization process implemented by the vehicle velocity estimate module 241. The second estimated vehicle velocity 318 can be further used in vehicle control applications such as by the electronic control system 118 in determining steering, braking and/or propulsion commands to be sent to the steering system 150, the braking system 160 and the engine 130.

Figure 4:
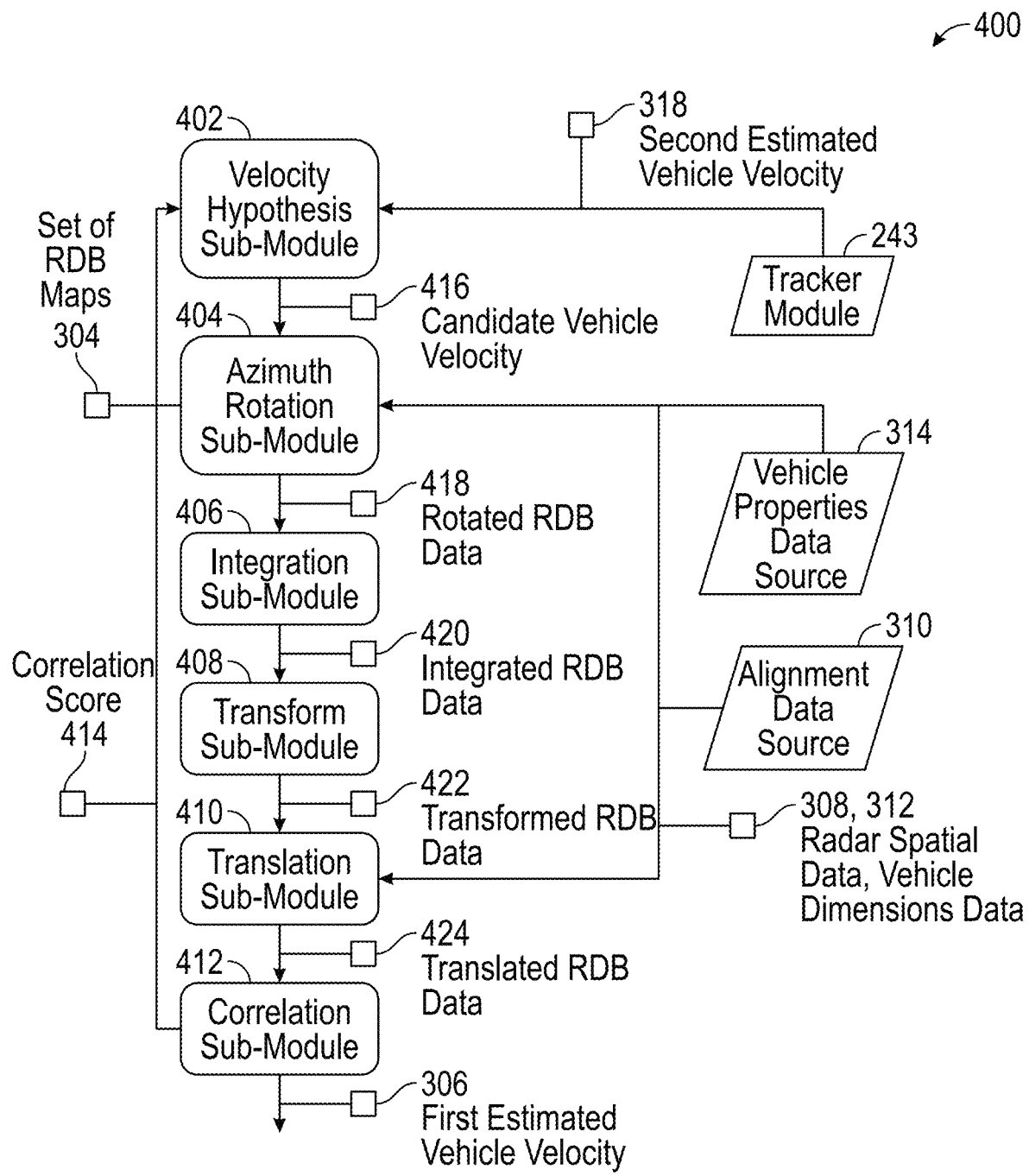
FIG. 4 is a more detailed data flow diagram of aspects of the vehicle velocity estimation process of FIG. 3, in accordance with an exemplary embodiment.

FIG. 4 is a dataflow diagram further describing the processes 400 of the vehicle estimation module 241. The vehicle estimation module 241 includes a velocity hypothesis sub-module 402 that receives the second estimated vehicle velocity 318 from the tracker module 243 and that receives a correlation score 414 from a correlation sub-module 412 described further below. The vehicle hypothesis sub-module 402 adjusts the second estimated vehicle velocity 318 and assesses the resulting impact on the correlation score 414. When the correlation score is sufficiently optimized, e.g. reaches a predetermined criterion (such as above a predetermined threshold when a high correlation score is the target), the vehicle hypothesis sub-module 402 may cease the optimization process and output the first estimated vehicle velocity 306 based on the current candidate vehicle velocity that resulted in the optimized correlation score 414. The velocity hypothesis sub-module may inject a single candidate vehicle velocity 416 into the subsequent processes at a time or a plurality of candidate vehicle velocities may be simultaneously injected and processed. In the latter case, a predicated velocity covariance matrix may be utilized to calculate initial candidate vehicle velocities for the subsequent processes. Whether a single or a plurality of candidate velocities are processed, the velocity hypothesis sub-module 402 may use a variety of alternative methods for determining the candidate vehicle velocity (or velocities) 416. In one example, a gradient descent or Nelder-Mead method is utilized, but other methods for setting a parameter in a given search space are available. The candidate vehicle velocity 416 and the first estimated vehicle velocity 306 are vectors and include $V_x$ (velocity in the x axis) and $V_y$ (velocity in the y axis). The y axis may extend along a longitudinal central axis of the vehicle 100 and the x axis is a lateral axis perpendicular to the longitudinal axis and passes through a center of gravity of the vehicle 100. The vehicle velocity may also include velocity along the z access (e.g. a three-dimensional vehicle velocity vector) in other embodiments.

Continuing to refer to FIG. 4, the azimuth rotation sub-module 404 receives the candidate vehicle velocity 416, which may be a vector of candidate vehicle velocities. The azimuth rotation sub-module 404 further receives the set of RDB maps 304 from each of the radar devices 132a to 132g after pre-processing. The azimuth rotation sub-module is configured to virtually rotate at least an azimuth angle (and optionally also an elevation angle) of the radar devices 132a to 132g so as to spatially register the set of RDB maps 304. The azimuth angle rotation is determined at least in part based on the candidate vehicle velocity 416. The spatial registration tends to transform each RDB map in the set of RDB maps 304 to the same frame of reference, specifically that of the local coordinates of the vehicle 100. That is, each radar device 132a to 132g, and each beam of each radar device 132a to 132g, is virtually rotated to be directed along the same axis of a local coordinate system of the vehicle 100. The azimuthal rotation is determined under two different modalities. A first modality is determined by transforming each range beam (RB) map in each RDB map 304 based on known orientation of the corresponding radar device 132a to 132g on the vehicle 100 and the azimuth axis for the RB map. A second modality is determined by transforming each range Doppler (RD) map in each RDB map 304 based on Doppler values (a Doppler vector) from the RD map and the candidate vehicle velocity 416. The second modality relies on the fact that the Doppler data contains information on the angle of the target that is calculable. By rotating each RD map based on the angle of a target object, all RD maps can be transformed to the same frame of reference corresponding to the local coordinates of the vehicle.

An exemplary specific algorithm for the azimuth rotation will be described. As explained before, there are two modalities of azimuth rotation and one of those rotations is based on the estimated candidate vehicle velocity 416. The closer the candidate vehicle velocity is to matching the actual vehicle velocity, then the better aligned the azimuth angular rotations from the two modalities. This will result in better spatial registration and ultimately a more optimal correlation score 414. In a first modality, the radar device 132a to 132g that produces each RB map in each RDB map of the set of RDB maps 304 is virtually rotated according to the following equation:

$$\hat{\theta}_i = \theta_i - \text{Yaw}_i, \quad 1 \leq i \leq NF \qquad \text{(equation 1)}$$

In equation 1, i is a radar index, $\theta_i$ is the azimuth axis for radar i and $\text{Yaw}_i$ is the yaw or angle of orientation of the radar i in the local coordinates of the vehicle 100. N is the number of radars and F is the number of frames (current and previous) such that an index number is designated not only for specific radar devices 132a to 132g but also for previous frames from the radar devices 132a to 132g. $\text{Yaw}_i$ is included or derived from the radar spatial data 308 and the vehicle dimensions data 312

In a second modality, the radar device 132a to 132g that produces each RD map in each RDB map of the set of RDB maps 304 is virtually rotated according to the following equations:

$$\theta_{d_i} = \pm \cos^{-1} \frac{D}{\|v_i\|} \qquad \text{(equation 2)}$$

-continued $$\hat{\theta}_{d_i} = \theta_{d_i} - \measuredangle(v_i) \quad \text{(equation 3)}$$

In equations 2 and 3, $v_i=(v_{x_i}, v_{y_i})$ is the velocity at radar i. The velocity at each radar device 132a to 132g will differ depending on its location relative to a center of gravity of the vehicle 100. The azimuth rotation sub-module 404 applies an adjustment to the candidate vehicle velocity 416 based on the position of the radar device 132a to 132g. The relative position of the radar device 132a to 132g to the center of gravity is known from the radar spatial data 308 and the vehicle dimensions data 312. The necessary adjustment is derived based on a vehicle dynamics model as is known in the art. $\|v_i\|$ is the velocity norm at the location of the radar i. $\measuredangle(v_i)$ is the velocity direction for radar i in the local coordinates of the vehicle 100, which is known based on the radar spatial data 308 and the vehicle dimensions data 312. Equation 2 defines a relationship between Doppler values in the RD map the estimated vehicle velocity representing an angle between a target object and the radar device i.

In embodiments, the azimuth rotation sub-module 404 outputs rotated RDB data 418 to the integration sub-module 406. More particularly, the rotated RDB data 418 includes the RD maps that have been transformed according to equations 2 and 3 and the RB maps that have been transformed according to equation 1. The integration module integrates or combines the RD maps and the RB maps after the azimuth rotation. This combination is performed by multiplication in one embodiment according to the following equation:

$$M_i(R_i, \hat{\theta}_i) = RD_i(R_i, \hat{\theta}_{d_i}) \cdot RB_i(R_i, \hat{\theta}_i) \quad \text{(equation 4)}$$

In equation 4, $RD_i$ is the RD map for radar i when radar device i has been virtually rotated by $\hat{\theta}_{d_i}$ and $RB_i$ is the RB map for radar i when the radar device i has been virtually translated by $\hat{\theta}_i$. $M_i$ represents the integration or combination of the RD and RB maps for each radar device 132a to 132g.

The transform sub-module 408 receives the integrated RDB data 420 and converts the data from polar coordinates to cartesian coordinates in the local coordinate frame of the vehicle 100. The following polar to cartesian coordinates transformation equations may be used:

$$x_i = R_i \cos(\hat{\theta}_i) \quad \text{(equation 5)}$$

$$y_i = R_i \sin(\hat{\theta}_i) \quad \text{(equation 6)}$$

In equations 5 and 6, $R_i$ is the radial position of the RDB data 420 in the local coordinates of the vehicle 100. The skilled person would appreciate that the transformation to cartesian coordinates could be performed earlier or later in the process 400

The translation sub-module 410 receives the transformed RDB data 422. The translation sub-module 410 uses a vehicle dynamics model to virtually translate radar devices 132a to 132g for historical frames included in the RDB data 422 so as to predict movement of the radar devices 132a to 132g in the time between the current time and the earlier time of capture of the previous frame of data. The vehicle dynamics model takes into account the candidate vehicle velocity 416. In one embodiment, the vehicle dynamics model is a relatively simple one that multiplies time difference between current time frame and time frame when the data was captured by the radar device 132a to 132g. However, more sophisticated vehicle dynamics models may be incorporated such as one taking into account both candidate vehicle velocity and vehicle acceleration. In one embodiment, the translation sub-module 410 translates the transformed RDB data 422 to the local coordinate system of the vehicle 100 and to current time based on the following equations:

$$\hat{x}_i = x_i - x_{radar_i} - \Delta T_i v_{x_i} \quad \text{(equation 7)}$$

$$\hat{y}_i = y_i - y_{radar_i} - \Delta T_i v_{y_i} \quad \text{(equation 8)}$$

In equations 7 and 8 $x_{radar_i}$, $y_{radar_i}$ are the radar i location as received from the alignment data source 310 and the vehicle properties data source 314 as part of the radar spatial data 308 and the vehicle dimensions data 312, and $\Delta T_i$ is the time difference between the frame of radar i to a current frame time.

The translated RDB data 424 provides an integrated RD map and RB map for a plurality of radar devices 132a to 132g and over a plurality of time frames for each radar device 132a to 132g. The translated RDB data 424 is registered spatially based on the candidate vehicle velocity 416 and is time registered based on the candidate vehicle velocity 416. The translated RDB data 424 provides many (NF) time and space registered RDB maps that overlap with each other in many areas. A greater degree of registration is achieved, the closer the candidate vehicle velocity is to the true velocity of the vehicle 100. The correlation sub-module 412 provides a quantitative measure of the degree of spatial registration in the translated RDB data 424. In one embodiment, the correlation sub-module 412 uses a normalized cross-correlation function to determine the correlation score 414. Other correlation functions are available. In one specific example, the correlation sub-module 412 may invoke the following equation:

$$r = \frac{\sum_m \sum_n (A_{mn} - \overline{A})(B_{mn} - \overline{B})}{\sqrt{\sum_m \sum_n (A_{mn} - \overline{A})^2 \sum_m \sum_n (B_{mn} - \overline{B})^2}}$$

Where $\overline{A}$=mean(A), and $\overline{B}$=mean(B).
(equation 9)

In equation 9, A,B are radar maps in the translated RDB data 424 for all different possible radar maps pairs. The correlation sub-module 412 arrives at the correlation score 414 based on an average of correlation scores for each map pair per the following equation:

$$\bar{r} = \text{mean}(r) \quad \text{(equation 10)}$$

$\bar{r}$ is the correlation score 414 for the current candidate vehicle velocity 416. The velocity estimation module 241 adjusts the candidate vehicle velocity 416 in order to optimize the correlation score 414 so as to maximize the degree of registration in the translated RDB data 424. When the correlation score is sufficiently optimized, the velocity estimation module 241 outputs the first estimated vehicle velocity 306.

Figure 5:
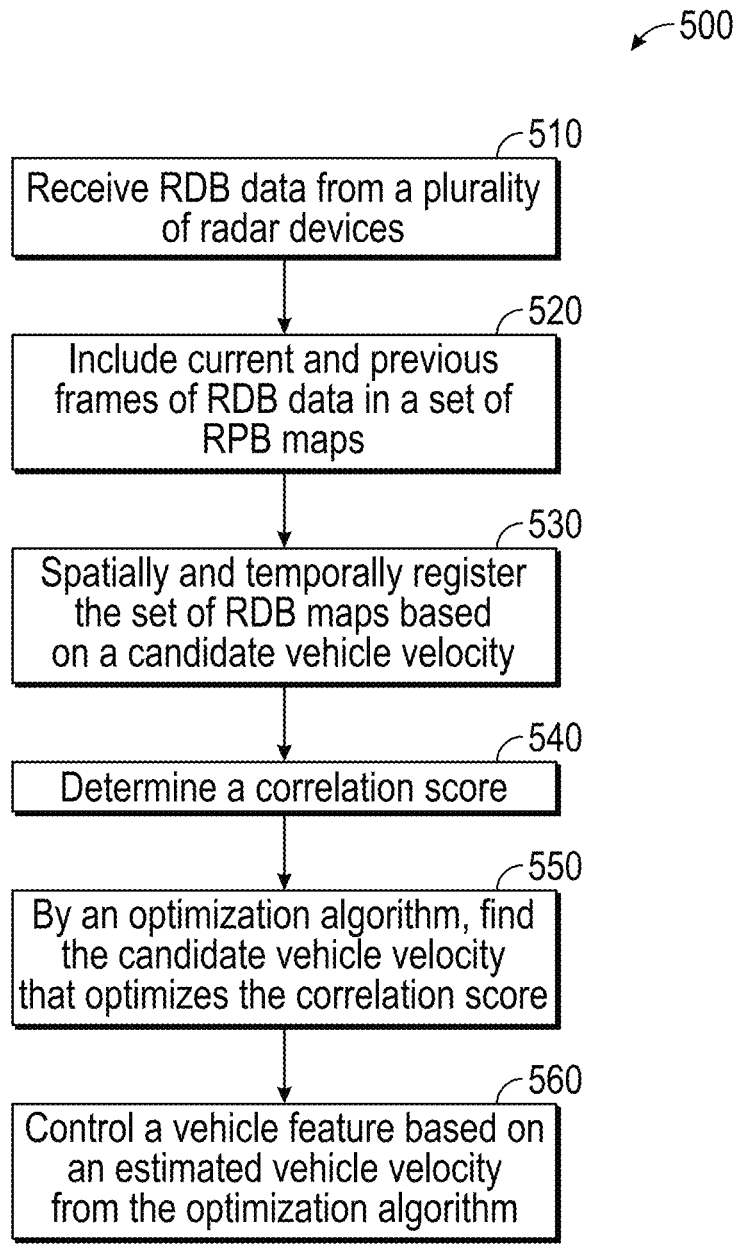
FIG. 5 is a flowchart of a method for implementing vehicle velocity estimation based on radar data, which can be used in connection with the vehicle of FIG. 1 and the control system of FIG. 2, in accordance with an exemplary embodiment.

FIG. 5 is a flowchart of a method 500 for estimating vehicle velocity based on radar data, in accordance with an exemplary embodiment. The method 500 can be implemented in connection with the vehicle 100 of FIG. 1 and the control system 102 of FIG. 2, in accordance with an exemplary embodiment. The method 500 may be implemented continuously during vehicle operation or intermittently in response to detection of certain vehicle conditions such as outage of GPS data or IMU failure. The estimated vehicle velocity resulting from the method 500 may be used in place of, or in combination with, vehicle velocity determinations from other measurement units such as a GPS or IMU.

Figure 6:
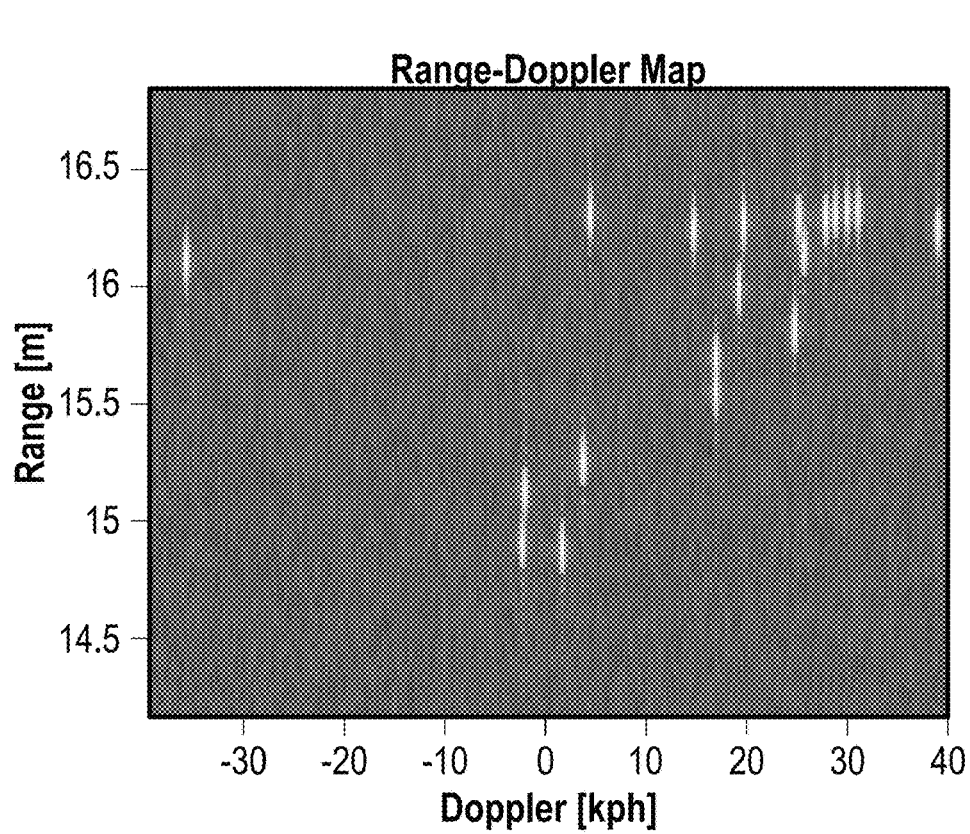
FIG. 6. is an exemplary range Doppler map for a radar device, in accordance with an exemplary embodiment.

As depicted in FIG. 5, the method 500 includes step 510 of receiving RDB data 302a to 302g from a plurality of radar devices 132a to 132g. The RDB data 302a to 302g is pre-processed to provide RDB maps 304a to 304g. In step 520, current and previous frames are included in the RDB maps 304a to 304g to provide a set of RDB maps for subsequent processing. Referring to FIG. 6, an exemplary RD map for a single beam of a single radar device is shown. As can be seen, there are a plurality of target objects viewed by the radar device. The set of RDB maps 304 will include such RD maps for a plurality of beam angles for each of a plurality of radar devices 132a to 132g and over a plurality of data frames.

In step 530, the set of RDB maps 304 are spatially and temporally registered with respect to each other based on a candidate vehicle velocity 416. Both spatial and temporal registration are calculated based on the candidate vehicle velocity 416. Spatial registration virtually rotates each radar device 132a to 132g so as to be oriented along a common axis in a common frame of reference (e.g. the local coordinates of the vehicle 100). The virtual rotation of each radar device 132a to 132g will consequently rotate the set of RDB maps 304. In embodiments, the spatial registration is performed using two modalities of rotation of the radar devices 132a to 132g. In a first modality, the RB map part of the RDB maps 304 is transformed based on the orientation of the respective radar device 132a to 132g using radar spatial data 308. In a second modality, the RD map part of the RDB maps 304 is transformed based on a relationship between Doppler energy and vehicle velocity at the respective radar device 132a to 132g. The second modality takes into account the orientation and position of the radar device in the local coordinates of the vehicle 100 based on the radar spatial data 308. The candidate vehicle velocity 416 is taken as the assumption of vehicle velocity, thereby incorporating the candidate vehicle velocity 416 into the spatial registration process. The RD maps and the RB maps transformed according to the first and second modalities are integrated to produce integrated RDB data 420, as has been described above. In the temporal registration process, previous frames of RDB maps 304 are translated based on a time elapsed between the previous time frame and the current time frame and the candidate vehicle velocity 416, thereby correcting the previous frames of RDB to take into account predicted movement of the respective radar device since the data was captured. The spatially and temporally registered RDB data is output in cartesian coordinates in the local coordinate frame of the vehicle 100 in the form of translated RDB data 424.

Figure 7:
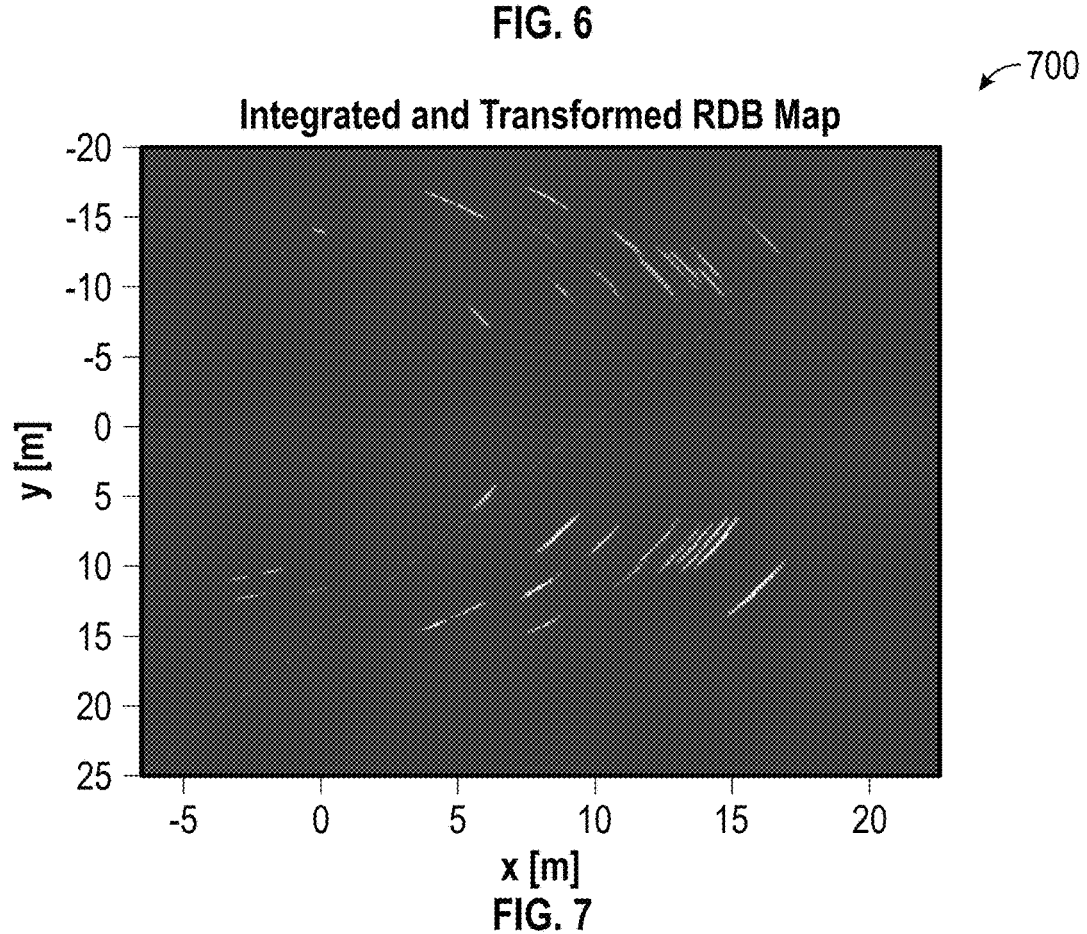
FIG. 7 is an exemplary range Doppler map after transformation processes described herein, in accordance with an exemplary embodiment.

Referring to FIG. 7, a simulation is illustrated in which the RD map 600 of FIG. 6 from a first radar device is spatially registered with an RD map from a second radar device that is oriented and positioned differently on a vehicle than the first radar device but which both capture a plurality of objects in their field of view. This is a simplified simulation to illustrate the concepts described herein. FIG. 7 illustrates an integrated and transformed RDB map 700 in which the RD maps from the first and second radar devices are spatially and temporally registered based on a candidate vehicle velocity according to method step 530. Since the candidate vehicle velocity closely aligns with the true vehicle velocity, a high degree of overlap between each object mark can be seen.

In step 540, a correlation score is determined based on the translated RDB data 424, which represents a degree of registration between each spatially and temporally registered RDB map. The correlation score is determined using any of a variety of available correlation functions. In step 550, an optimization algorithm is executed that finds, by iterative adjustment, the candidate vehicle velocity 416 that optimizes the correlation score (e.g. minimizes the correlation score when a low correlation score represents a high degree of spatial registration). The optimization algorithm relies on iteratively performing steps 520 and 530 and consequently evaluating the correlation score with respect to adjustments of the candidate vehicle velocity 416. When the correlation score has been optimized by a particular candidate vehicle velocity 416, the candidate vehicle velocity is output as the first estimated vehicle velocity 306.

In step 560, a vehicle feature is controlled based, directly or indirectly, on the first estimated vehicle velocity 306 determined by the optimization algorithm of step 550. The vehicle feature may a steering, braking or propulsion command. In some embodiments, the first estimated vehicle velocity 306 is smoothed by a tracker to provide the second estimated vehicle velocity 318, which is used in automated control of the vehicle feature in step 560.

The estimated vehicle velocity 306 or 308 is fed back to the optimization algorithm as an initial estimate of the vehicle velocity at the start of a next iteration of the optimization process of steps 530 to 550. The estimated vehicle velocity 306 or 308 may be subject to further calculations in order to derive other vehicle dynamics parameters such as acceleration for us in vehicle control. The method 500 may be repeated as each new frame of raw radar data 302a to 302g is received.

It will be appreciated that the disclosed methods, systems, and vehicles may vary from those depicted in the Figures and described herein. For example, the vehicle 100 and the control system 102 and/or various components thereof may vary from that depicted in FIGS. 1 and 2 and described in connection therewith. In addition, it will be appreciated that certain steps of the method 500 may vary from those depicted in FIG. 5 and/or described above in connection therewith. It will similarly be appreciated that certain steps of the method described above may occur simultaneously or in a different order than that depicted in FIG. 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of estimating vehicle velocity of an own vehicle based on radar data, the method comprising:
  receiving a set of Range-Doppler-Beam, RDB, maps from at least one radar located on the own vehicle, wherein the set of RDB maps include RDB maps from a plurality of radars located at different positions and/or orientations with respect to the own vehicle;

performing an optimization process, via at least one processor of the own vehicle, by optimizing a correlation score by adjusting an estimate of vehicle velocity of the own vehicle, wherein the optimization process includes iteratively:
spatially registering the set of RDB maps based on the current estimate of vehicle velocity of the own vehicle; and
determining the correlation score based on the spatially registered set of RDB maps;
wherein the estimate of vehicle velocity is a vector of at least two dimensions including speed along a y axis extending along a longitudinal central axis of the own vehicle and speed along an x axis that is a lateral axis perpendicular to the longitudinal axis and passes through a center of gravity of the own vehicle;
outputting, via the at least one processor of the own vehicle, an optimized estimate of vehicle velocity of the own vehicle from the optimization process when the correlation score has been optimized; and
controlling the own vehicle based at least in part on the optimized estimate of vehicle velocity of the own vehicle.

2. The method of claim 1, wherein the set of RDB maps include a current and/or a previous frame from the at least one radar.

3. The method of claim 1, wherein spatially registering the set of RDB maps includes rotating an azimuth angle of the set of RDB maps to a local coordinate system based on the current estimate of vehicle velocity of the own vehicle.

4. The method of claim 1, wherein spatially registering the set of RDB maps includes, for each of the RDB maps, virtually rotating the at least one radar according to a Doppler based azimuth angle, thereby transforming range Doppler maps of the RDB maps, the Doppler based azimuth angle determined based on Doppler data and the current estimate of vehicle velocity of the own vehicle, and virtually rotating the at least one radar according to a second azimuth angle, the second azimuth angle determined based on radar orientation information for the at least one radar relative to a local coordinate frame of the own vehicle, thereby transforming range beam maps of the RDB maps and multiplying the transformed range Doppler maps and the transformed range beam maps to provide azimuth rotated RDB maps, wherein the azimuth rotated RDB maps form a basis for determining the spatially registered set of RDB maps.

5. The method of claim 1, wherein the set of RDB maps includes a current and previous frame, wherein spatially registering the set of RDB maps includes correcting for own vehicle movement between the current and previous frames based on the current estimate of vehicle velocity of the own vehicle and the frame rate.

6. The method of claim 1, wherein the optimization process utilizes an optimization algorithm.

7. The method of claim 1, wherein the set of RDB maps are received from a pre-processing module comprising at least one processor executing one or more software programs stored on memory to perform analog to digital conversion, range fast Fourier transform, FFT, Doppler FFT and beamforming processes.

8. A vehicle comprising:
at least one radar located on the vehicle; and
at least one processor in operable communication with the at least one radar, the at least one processor configured to execute program instructions, wherein the program instructions are configured to cause the at least one processor to:
receive a set of range-Doppler-beam, RDB, maps from the at least one radar located on the vehicle, wherein the set of RDB maps include RDB maps from a plurality of radars located at different positions and/or orientations with respect to the own vehicle;
perform an optimization process by optimizing a correlation score by adjusting an estimate of vehicle velocity of the vehicle, wherein the optimization process includes iteratively:
spatially registering the set of RDB maps based on the current estimate of vehicle velocity of the vehicle; and
determining the correlation score based on the spatially registered set of RDB maps;
wherein the estimate of vehicle velocity is a vector of at least two dimensions including speed along a y axis extending along a longitudinal central axis of the own vehicle and speed along an x axis that is a lateral axis perpendicular to the longitudinal axis and passes through a center of gravity of the own vehicle;
output an optimized estimate of vehicle velocity of the vehicle from the optimization process when the correlation score has been optimized; and
control the vehicle based at least in part on the optimized estimate of vehicle velocity.

9. The vehicle of claim 8, wherein the set of RDB maps include a current and/or a previous frames from one or more radars.

10. The vehicle of claim 8, wherein spatially registering the set of RDB maps includes rotating an azimuth angle of the set of RDB maps to a local coordinate system based on the current estimate of vehicle velocity.

11. The vehicle of claim 8, wherein spatially registering the set of RDB maps includes, for each of the RDB maps, virtually rotating the at least one radar according to a Doppler based azimuth angle, thereby transforming range Doppler maps of the RDB maps, the Doppler based azimuth angle determined based on Doppler data and the current estimate of vehicle velocity, and virtually rotating the at least one radar according to a second azimuth angle, the second azimuth angle determined based on radar orientation information for the at least one radar relative to a local coordinate frame of the vehicle, thereby transforming range beam maps of the RDB maps and multiplying the transformed range Doppler maps and the transformed range beam maps to provide azimuth rotated RDB maps, wherein the azimuth rotated RDB maps form a basis for determining the spatially registered set of RDB maps.

12. The vehicle of claim 8, wherein the set of RDB maps includes a current and previous frame, wherein spatially registering the set of RDB maps includes correcting for vehicle movement between the current and previous frames based on the current estimate of vehicle velocity and the frame rate.

13. The vehicle of claim 8, wherein the optimization process utilizes an optimization algorithm.

14. The vehicle of claim 8, wherein the set of RDB maps are received from a pre-processing module comprising at least one processor executing one or more software programs stored on memory to perform analog to digital conversion, range fast Fourier transform, FFT, Doppler FFT and beamforming processes.

15. A system for estimating vehicle velocity of an own vehicle based on radar data, the system comprising:
at least one processor in operable communication with at least one radar, the at least one processor configured to execute program instructions, wherein the program instructions are configured to cause the at least one processor to:

receive a set of range-Doppler-beam, RDB, maps from at least one radar located on the own vehicle, wherein the set of RDB maps include RDB maps from a plurality of radars located at different positions and/or orientations with respect to the own vehicle;

perform an optimization process by adjusting an estimate of vehicle velocity of the own vehicle by optimizing a correlation score, wherein the optimization process includes iteratively:

spatially registering the set of RDB maps based on the current estimate of vehicle velocity of the own vehicle; and determining the correlation score based on the spatially registered set of RDB maps;

wherein the estimate of vehicle velocity is a vector of at least two dimensions including speed along a y axis extending along a longitudinal central axis of the own vehicle and speed along an x axis that is a lateral axis perpendicular to the longitudinal axis and passes through a center of gravity of the own vehicle;

output an optimized estimate of vehicle velocity of the own vehicle from the optimization process when the correlation score has been optimized; and control the own vehicle based at least in part on the optimized estimate of vehicle velocity of the own vehicle.

16. The system of claim 15, wherein the set of RDB maps include a current and/or a previous frames from the at least one radar.

17. The system of claim 15, wherein spatially registering the set of RDB maps includes rotating an azimuth angle of the set of RDB maps to a local coordinate system based on the current estimate of vehicle velocity of the own vehicle.

* * * * *